(12) United States Patent
Nozawa et al.

(10) Patent No.: US 6,339,508 B1
(45) Date of Patent: Jan. 15, 2002

(54) PHOTOGRAPHIC OPTICAL SYSTEM

(75) Inventors: Toshihide Nozawa; Yuko Kobayashi, both of Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/496,289

(22) Filed: Feb. 1, 2000

(30) Foreign Application Priority Data

Jan. 2, 1999 (JP) ............................................. 11-023367

(51) Int. Cl.⁷ .............................. G02B 15/14; G02B 7/02
(52) U.S. Cl. ..................... 359/686; 359/689; 359/694; 359/691; 359/793; 359/795; 359/823; 396/429
(58) Field of Search ................................ 359/686, 689, 359/691, 692, 694, 771, 753, 793, 795, 823; 396/429, 366, 419

(56) References Cited

U.S. PATENT DOCUMENTS

| | | | |
|---|---|---|---|
| 3,944,324 A | * 3/1976 | Tajima et al. | 359/691 |
| 4,009,942 A | * 3/1977 | Hirose | 359/691 |
| 4,461,544 A | * 7/1984 | Isobe et al. | 359/823 |
| 4,493,536 A | 1/1985 | Kudo | 359/753 |
| 4,697,694 A | * 10/1987 | Kawai | 359/694 |
| 5,202,867 A | * 4/1993 | Matsui et al. | 359/795 |
| 5,648,835 A | 7/1997 | Uzawa | 396/429 |
| 5,659,427 A | * 8/1997 | Iyama | 359/689 |

FOREIGN PATENT DOCUMENTS

| | | |
|---|---|---|
| JP | 57-163212 | 10/1982 |
| JP | 64-61714 | 3/1989 |
| JP | 2-85816 | 3/1990 |
| JP | 6-107070 | 4/1994 |
| JP | 9-166748 | 6/1997 |
| JP | 9-211287 | 8/1997 |

* cited by examiner

Primary Examiner—Loha Ben
(74) Attorney, Agent, or Firm—Pillsbury Winthrop, LLP

(57) ABSTRACT

A photographic optical system comprising a front lens unit which comprises at least a negative lens element and has negative refractive power as a whole, a rear lens unit which comprises at least two positive lens elements and at least a negative lens element and has positive refractive power as a whole as well as a reflecting member to fold an optical path and an aperture stop which are disposed between the front lens unit and the rear lens unit, and has an adequately defined focal length of the front lens nit and an adequately defined distance along an optical axis between the front lens unit to the aperture stop. This photographic optical system is composed of a small number of lens elements, has a large field angle and exhibits favorable optical performance.

25 Claims, 15 Drawing Sheets

FIG. 11
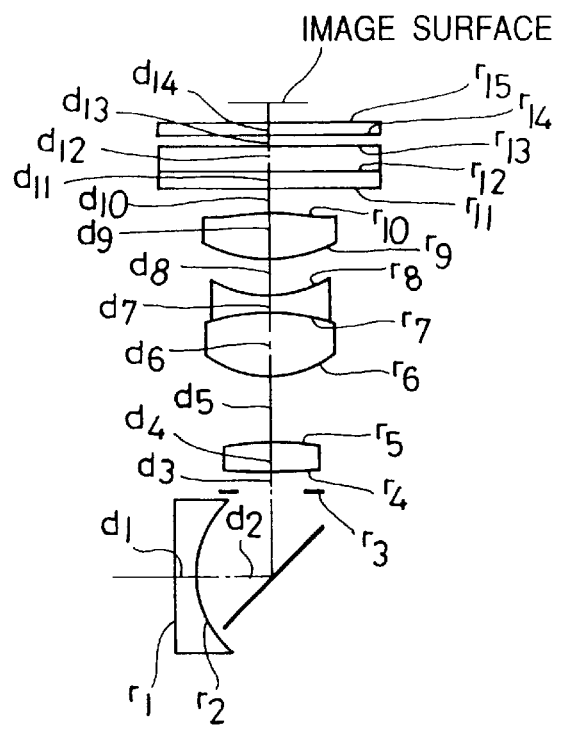
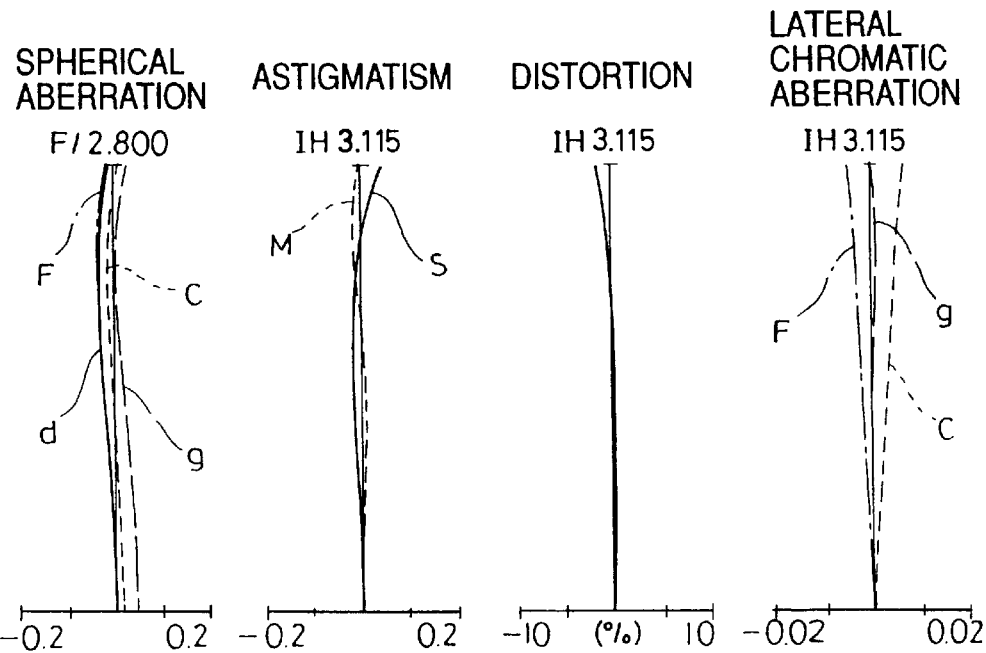
FIG. 12A  FIG. 12B  FIG. 12C  FIG. 12D
SPHERICAL ABERRATION  ASTIGMATISM  DISTORTION  LATERAL CHROMATIC ABERRATION

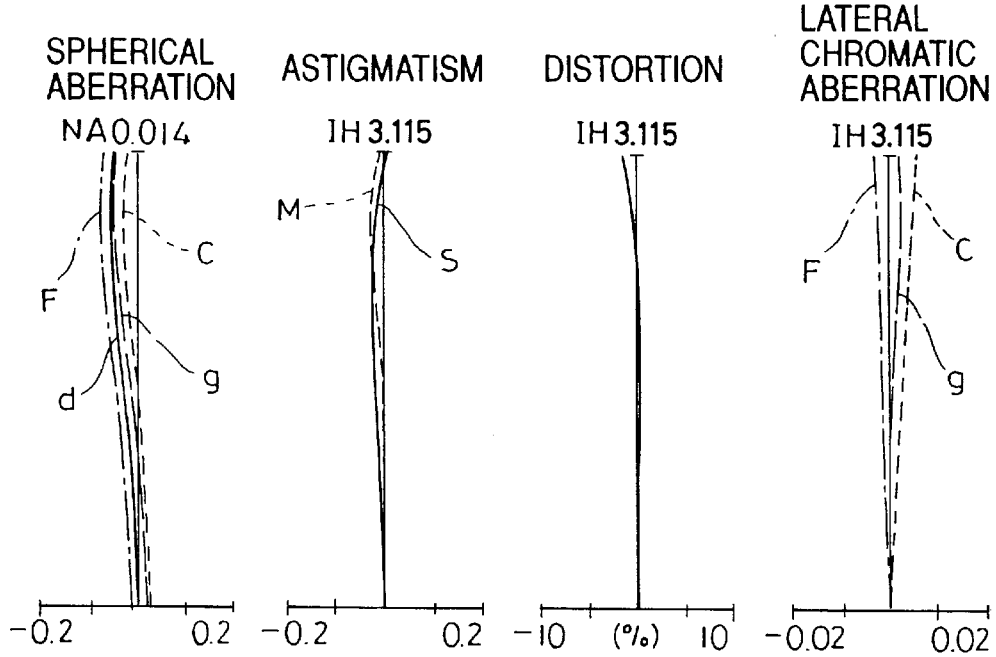
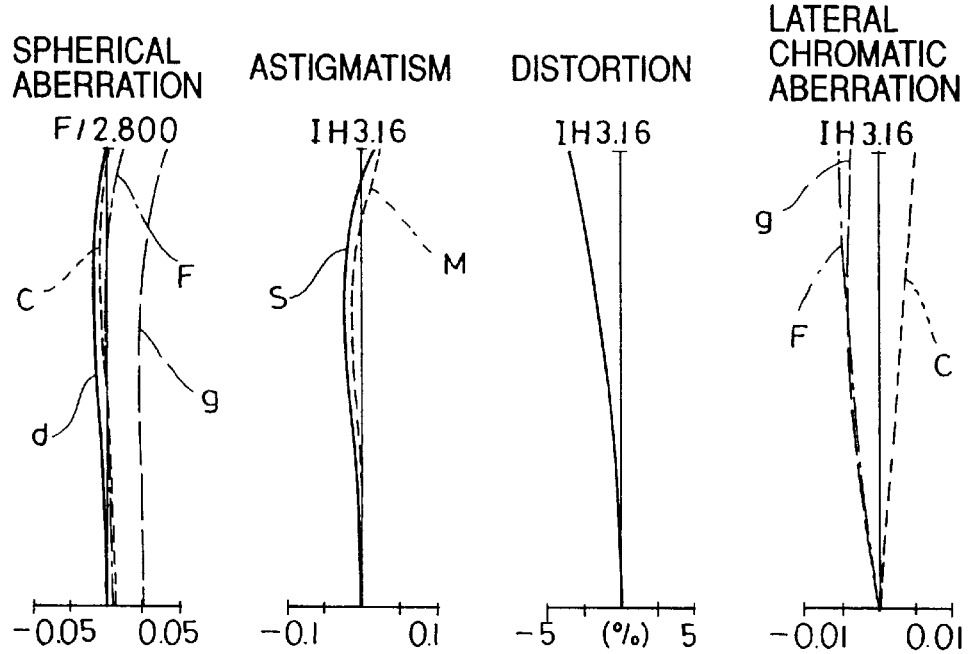

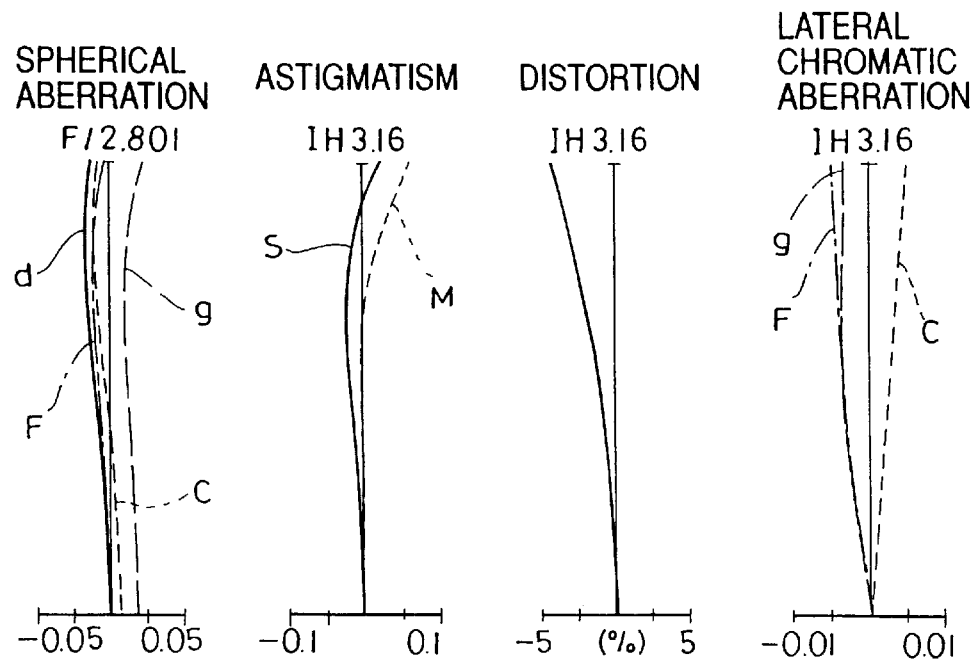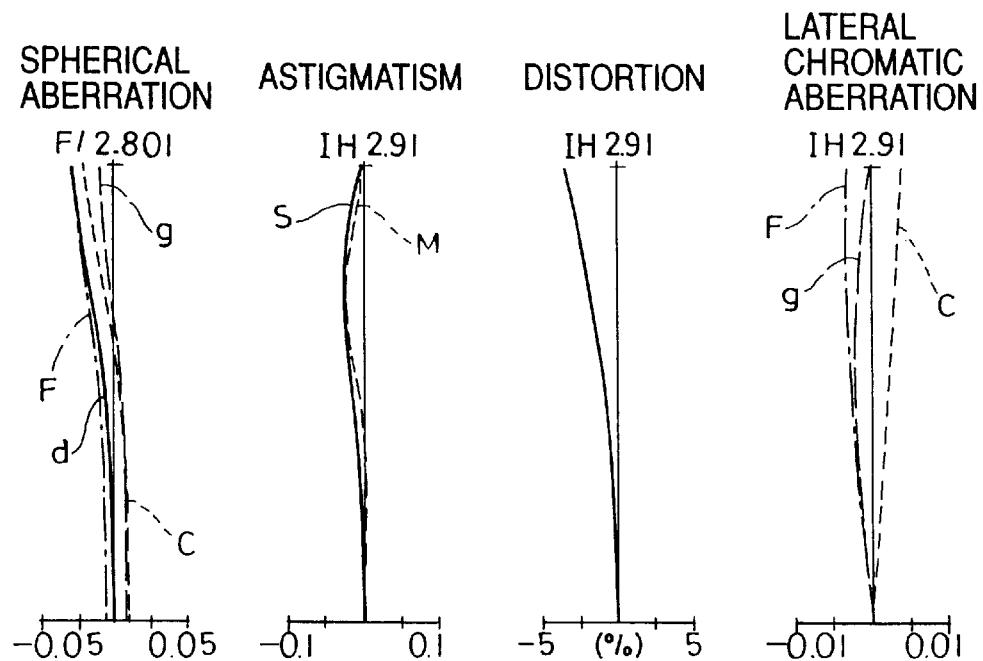

PHOTOGRAPHIC OPTICAL SYSTEM

BACKGROUND OF THE INVENTION a) Field of the Invention

The present invention relates to a retrofocus type photographic optical system which is suited for use in an image pickup apparatus adopted for cameras, in particular digital still cameras, portable telephones, portable mobile personal computers and so on.

b) Description of the Prior Art

As conventional examples of retrofocus type photographic optical system consisting of a small number of lens elements, there are known an optical system disclosed by Japanese Patent Kokai Publication No. Sho 57-163212 which consists of five negative, positive, negative, positive and positive lens elements, an optical system disclosed by Japanese Patent Kokai Publication No. Sho 64-61714 which consists of five negative, positive, negative, positive and positive lens elements or four negative, positive, negative and positive lens elements, an optical system disclosed by Japanese Patent Kokai publication No. Hei 2-85816 which consists of five negative, positive, negative, positive and positive lens elements, and an optical system disclosed by Japanese Patent Kokai Publication No. Hei 9-166748 which consists of five negative, positive, negative, positive and positive lens elements.

Though these optical systems consists of relatively small numbers of lens elements, it is difficult to sufficiently thin camera bodies when these optical systems are used.

There is known an optical system which is configured to fold an optical path in order to thin a camera body. Known as conventional examples of such an optical system are optical systems which are disclosed by Japanese Patents Kokai Publication No. Hei 6-107070 and No. Hei 9-211287. The former is configured for use in an on-vehicle camera and performance of the optical system has not attained yet to a level for use in a digital camera having a large number of picture elements. Furthermore, the optical system is configured with no consideration of focusing. Optical performance and others of the latter are unknown since the patent provides no numerical data though it describes folding an optical path with a prism.

SUMMARY OF THE INVENTION

A primary object of the present invention is to provide a photographic optical system which comprises, in order from the object side, a front lens unit comprising at least a negative lens element and having negative refractive power as a whole, and a rear lens unit comprising at least two positive lens elements and at least a negative lens element and having positive refractive power as a whole, comprises a reflecting member to fold an optical path and an aperture stop which are disposed in order from the object side between the front lens unit and the rear lens unit, and satisfies the following conditions (1) and (2):

$$1.5 < |f_F|/f < 3.5 \quad (1)$$

$$1.6 < d_M/f < 2.6 \quad (2)$$

Another object of the present invention is to provide a photographic optical system which comprises, in order from the object side, a front lens unit comprising at least a negative lens element and having negative refractive power as a whole and a rear lens unit comprising at least a positive lens element and having positive refractive power as a whole to form an image pickup surface, uses a reflecting member to fold an optical path which is disposed between the front lens unit and the rear lens unit, and is configured to be focused by changing a distance along an optical axis between the front lens unit and the image pickup surface.

BRIEF DESCRIPTION OF THE DRAWINGS

FIGS. 1 through 11 are sectional views illustrating compositions of first through eleventh embodiments of the photographic optical system according to the present invention:

FIGS. 12A–12D show curves illustrating aberration characteristics of the second embodiment of the present invention for an object located at an infinite distance;

FIGS. 13A–13D show curves illustrating aberration characteristics of the second embodiment of the present invention for an object located at a distance of 10 cm;

FIGS. 14A–14D show curves illustrating aberration characteristics of the seventh embodiment of the present invention for the object located at the inifinite distance;

FIGS. 15A–15D show curves illustrating aberration characteristics of the seventh embodiment of the present invention for the object located at the distance of 10 cm when the optical system is focused on the object by moving a front lens unit;

FIGS. 16A–16D show curves illustrating aberration characteristics of the seventh embodiment of the present invention for the object located at the distance of 10 cm when the optical system is focused on the object by moving the optical system as a whole;

DETAILED DESCRIPTION OF THE PREFERRED EMBODIMENTS

Figure 1:
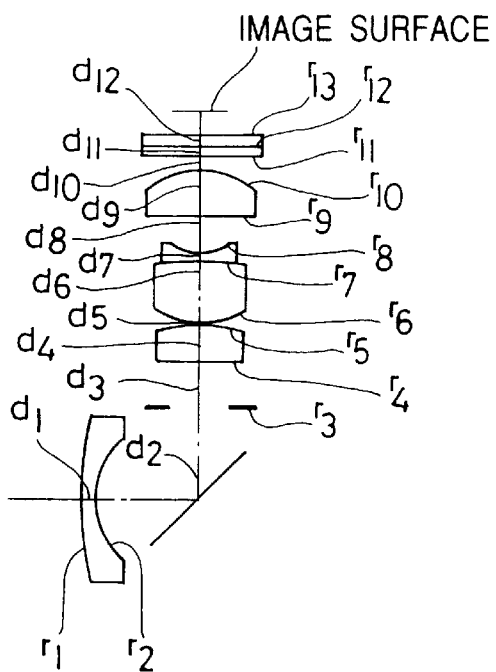
Figure 2:
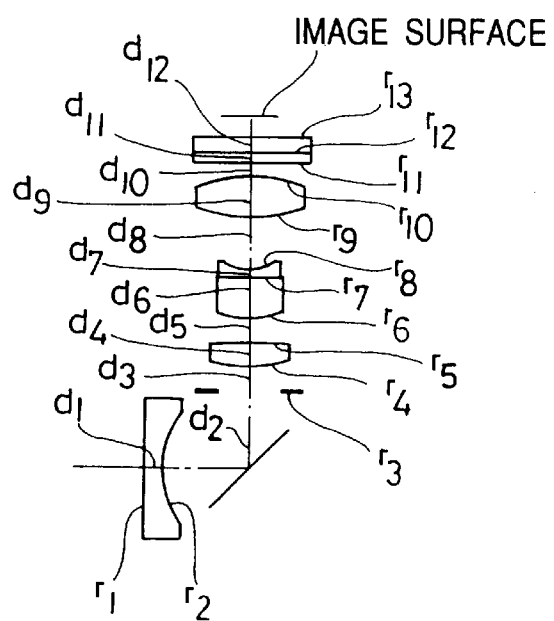
Figure 3:
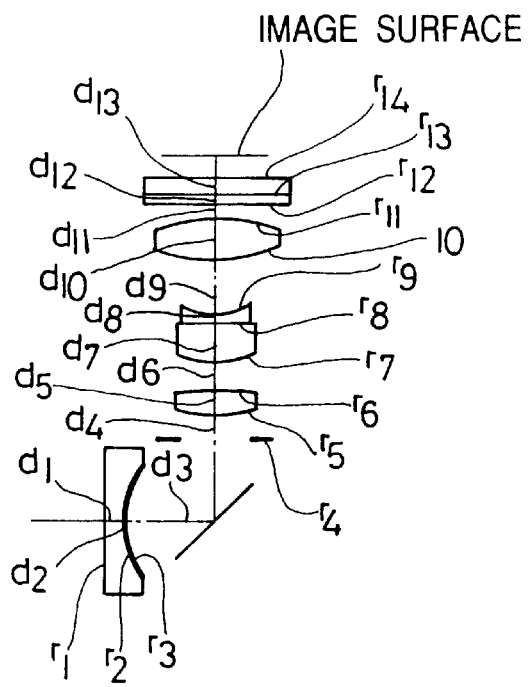
Figure 4:
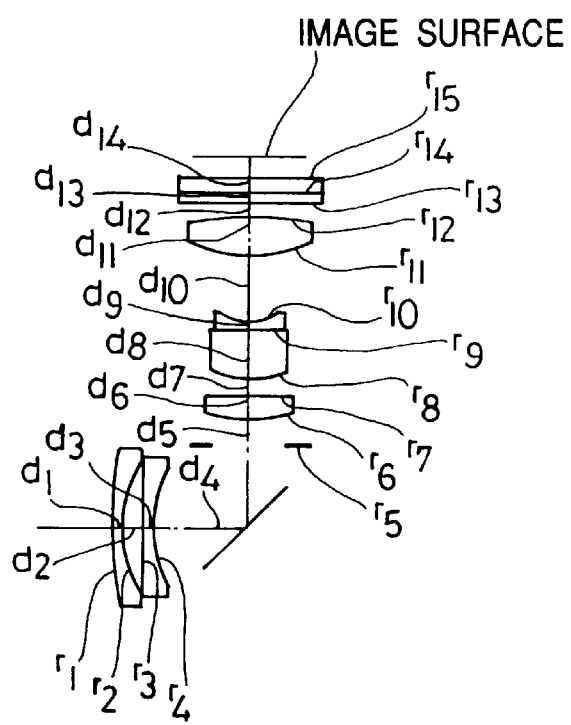
Figure 5:
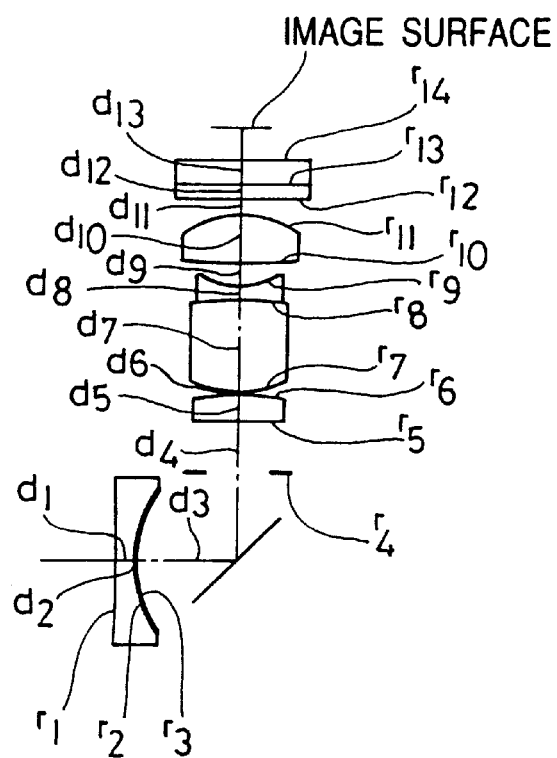
Figure 6:
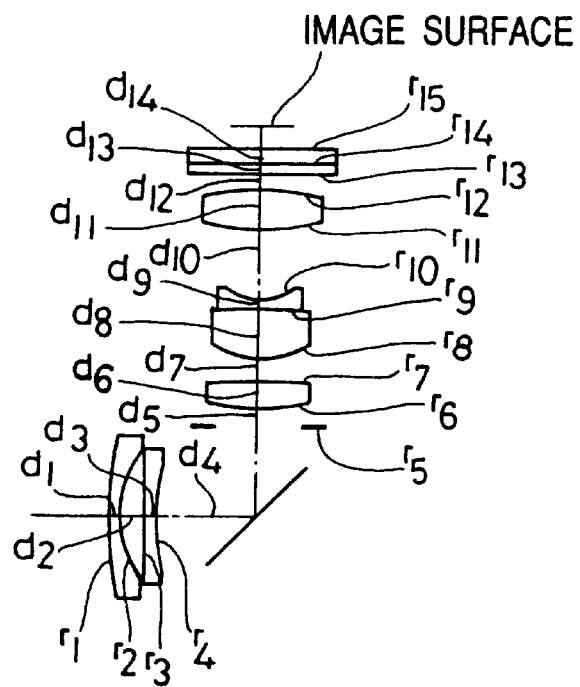
Figure 7:
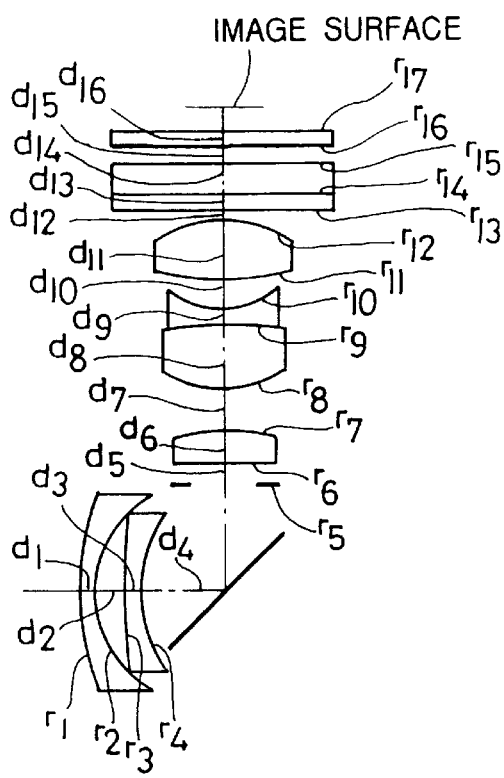
Figure 8:
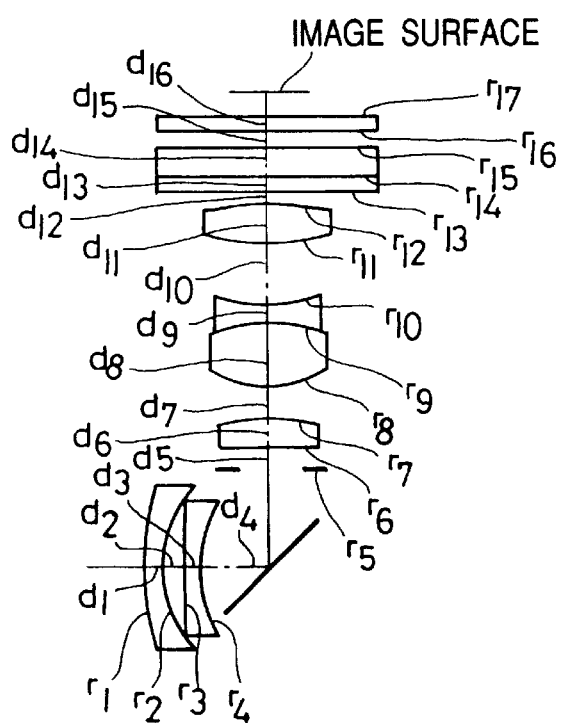
Figure 9:
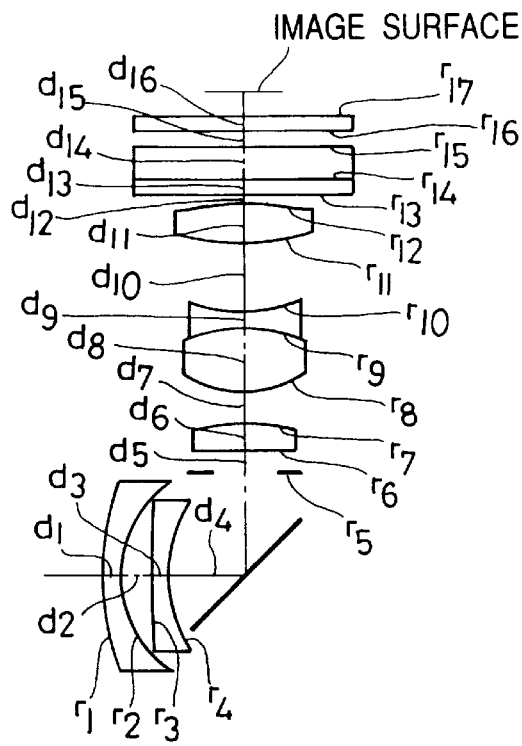
Figure 10:
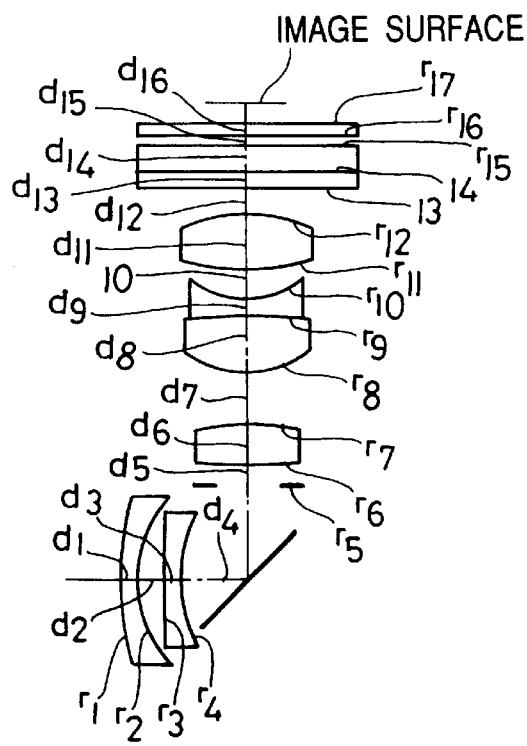

The photographic optical system according to the present invention is characterized in that it comprises, in order from the object side, a front lens unit which comprises at least a negative lens element and has negative power as a whole and a rear lens unit which comprises at least two positive lens elements and at least a negative lens element, and has positive power as a whole, that the optical system uses a reflecting member to fold an optical path and an aperture stop which are disposed in order from the object side between the front lens unit and the rear lens unit, and that the optical system satisfies the following conditions (1) and (2):

$$1.5 < |f_F|/f < 3.5 \quad (1)$$

$$1.6 < d_M/f < 2.6 \quad (2)$$

wherein the reference symbol f represents a focal length of the optical system as a whole, the reference symbol $f_F$ designates a focal length of the front lens unit and the reference symbol $d_M$ denotes a distance as measured along an optical axis from a final surface of the front lens unit to the aperture stop.

The photographic optical system according to the present invention is configured as a retrofocus type which consists of the front lens unit having the negative power and the rear lens unit having the positive power so that the optical system reserves a back focal length required to dispose a low pass filter and an infrared cut filter which are necessary for a digital camera, and has a wide field angle.

Furthermore, the optical system is configured to thin a camera body by folding the optical path with the reflecting member such as a mirror which is disposed between the front lens unit and the rear lens unit.

Furthermore, the aperture stop is disposed just after the reflecting member to shorten a distance between a central light bundle and a marginal light bundle on the reflecting member so that an optically effective range required for the reflecting member is narrowed and the optical system is compact.

The optical system according to the present invention is configured to satisfy the conditions (1) and (2) mentioned above.

The condition (1) defines the focal length of the front lens unit so as to reserve a desired back focal length and suppress production of distortion.

If the lower limit of 1.5 of the condition (1) is exceeded, the front lens unit will have too short a focal length which is advantageous for the optical system to reserve the required back focal length but the optical system will produce distortion in a large amount and be practically unusable. If the upper limit of 3.5 of the condition (1) is exceeded, in contrast, the optical system can hardly reserve the required back focal length, whereby there will be no space to dispose the low pass filter and the infrared cut filter.

Furthermore, the optical system according to the present invention is configured to satisfy the condition (2) so that it reserves an airspace to dispose the reflecting member.

If the lower limit of 1.6 of the condition (2) is exceeded, there will be no space to dispose the reflecting member or if the upper limit of 2.6 of the condition (2) is exceeded, the optical system will have a large total length and the front lens unit will have too large a diameter, whereby the optical system will be large.

For the optical system according to the present invention which has the composition described above, it is desirable that the rear lens unit comprises three lens components of four lens elements which are, in order from the object side, a first positive biconvex lens elements, a cemented lens component consisting of a positive lens element and a negative lens element, and a second positive lens element, that the second positive lens element has an aspherical surface, and that the optical system satisfies the following condition (3):

$$2<S_d/f<5 \qquad (3)$$

wherein the reference symbol $S_d$ represents a distance as measured on the optical axis from the aperture stop to a paraxial image surface (a filter section is to be calculated as an optical path length).

In the rear lens unit of the optical system according to the present invention, the first positive lens element has a function to converge a light bundle which is diverged by the front lens unit. To suppress production of spherical aberration, it is preferable to configure the first positive lens element so as to have curvature on an object side surface which is lower than that on an image side surface.

Furthermore, the cemented lens component is used in the rear lens unit to favorably correct mainly chromatic aberration and a Petzval's sum, and the second positive lens element disposed on the image side has functions to locate an exit pupil far from the image surface and correct mainly astigmatism. Furthermore, the aspherical surface used on the second positive lens element can suppress production of distortion by this positive lens element, thereby allowing the optical system to have a wide field angle.

A camera can be made more compact in a direction of its thickness by disposing the reflecting member as described above. When the optical system is enlarged after it is folded with the reflection member, however, the optical system undesirably enlarges the camera in a vertical direction or a horizontal direction. For this reason, it is preferable that the optical system according to the present invention satisfies the above-mentioned condition (3).

If the upper limit of 5 of the condition (3) is exceeded, the optical system will have too large a total length or if the lower limit of 2 is exceeded, it will be difficult to locate the exit pupil far from the image surface and when the optical system is used in an electronic image pickup apparatus of a digital still camera or the like which uses a CCD in particular, an image will be eclipsed due to shading.

It is more desirable that the optical system according to the present invention satisfies, in place of the condition (3), the following condition (3-1):

$$2.7<S_d/f<4.3. \qquad (3\text{-}1)$$

For the optical system according to the present invention, the front lens unit can be composed of a negative meniscus lens element as in a first embodiment which is described later. In such a case, however, performance of the optical system is liable to be degraded due to eccentricity of the front lens unit.

When the reflecting member is disposed between the front lens unit and the rear lens unit, the front lens unit is apt to be eccentric from the rear lens unit at a manufacturing stage. To reduce degradation of the performance due to the eccentricity, it is desirable to configure the front lens unit so that it has low curvature on each surface. Distortion can easily be corrected with the front lens unit and it is preferable for correction of distortion to configure the front lens unit as a negative meniscus lens element. When the front lens unit is configured as the negative meniscus lens element, however, the front lens unit has high curvature on its image side surface.

It is therefore preferable for the optical system according to the present invention to use an aspherical surface so that the negative lens element produces distortion in a small amount and has low curvature on the image side surface.

When the front lens unit is composed of two negative lens elements one of which is a negative meniscus lens element having a convex object side surface and the other of which is a negative lens element having curvature on an image side surface higher than that on the object side surface, it is possible to lower curvature on each surface by sharing power of the front lens unit as a whole between the two negative lens elements and suppress production of distortion.

To reduce the degradation of the performance due to the eccentricity of the front lens unit, it is desirable to satisfy the following condition (4):

$$0.5/|f_F|<|\Phi(F)|_{MAX}<1.2/|f_F| \qquad (4)$$

wherein the reference symbol $|\Phi(F)|_{MAX}$ represents a maximum value in absolute of surface power of the front lens unit and power $\Phi$ is given by the following equation:

$$\Phi=(N'-N)/R$$

wherein the reference symbols N' and N represent refractive indices on a side of emergence and a side of incidence respectively of the surface, and the reference symbol R designates a radius of curvature.

If the upper limit of the condition (4) is exceeded, the front lens unit will have a surface which has a strong power, thereby aggravating the degradation of the performance due to the eccentricity. If the lower limit of the condition (4) is exceeded, in contrast, it will be difficult to compose the front lens unit of a small number of lens elements, thereby enlarging the optical system and enhancing a manufacturing cost of a lens system.

For the optical system according to the present invention, i.e., an optical system which comprises, in order from the object side, a front lens unit comprising at least a negative lens element and having negative power as a whole, and a rear lens unit comprising at least two positive lens elements and at least a negative lens element and having positive power as a whole, includes a reflecting member to fold an optical path and an aperture stop which are disposed in order from the object side between the front lens unit and the rear lens unit, and satisfies the conditions (1) and (2), it is desirable that a first positive lens element disposed in the rear lens unit satisfies the following condition (5):

$$28 < v_{P1} < 57 \tag{5}$$

wherein the reference symbol $v_{P1}$ represents an Abbe's number of the first positive lens element.

If the Abbe's number $v_{P1}$ exceeds the lower limit of 28 or the upper limit of 57 of the condition (5), longitudinal chromatic aberration will be undercorrected or overcorrected, thereby providing a result which is not preferable to obtain more favorable optical performance.

It is more desirable to satisfy, in place of the condition (5), the following condition (5-1):

$$32 < v_{P1} < 48. \tag{5-1}$$

When the first positive lens element satisfies the condition (5-1), it is possible to obtain a photographic optical system which exhibits high performance from a central portion to a marginal portion.

Furthermore, the photographic optical system according to the present invention can be focused by moving the front lens unit or the rear lens unit. However, the photographic optical system can be focused on an object located at a shorter distance by moving the front lens unit toward the object side when astigmatism and spherical aberration are reduced in the front lens unit by composing this lens unit of a negative lens element having an aspherical surface or two lens elements, in order from the object side, a negative meniscus lens element having a convex object side surface and a negative lens element having curvature on an image side surface which is higher than that on an object side surface.

When an image pickup device which has a rectangular image pickup surface is used, the optical axis may be folded along a short side or a long side of the rectangular image pickup surface. It is preferable to fold the optical axis in the direction along the short side since such a folding direction narrows a space to be occupied by the reflecting member.

Now, description will be made of preferable focusing means for the optical system according to the present invention.

Means which is described below is preferable for focusing the photographic optical system according to the present invention, i.e., the photographic optical system comprising, in order from the object side, the front lens unit which comprises at least the negative lens element and has negative power as a whole and the rear lens unit which comprises at least the positive lens element and has the positive power as a whole, forms an image pickup surface, and uses the reflecting member to fold the optical axis which is disposed between the front lens unit and the rear lens unit.

The means is to focus the optical system according to the present invention by changing a distance along the optical axis between the front lens unit and the image pickup surface. For example, the distance between the front lens unit and the image pickup surface is prolonged to focus the optical system from an object located at a long distance onto an object located at a short distance and shortened to focus the optical system from the object located at the short distance onto the object located at the long distance.

Though the optical system according to the present invention can be focused from the object located at the long distance onto the object located at the short distance with the distance along the optical axis between the front lens unit and the image pickup surface kept constant, it is possible by moving the front lens unit to make variations of a state of a light bundle passing through the rear lens unit and optical performance smaller than those caused by moving the rear lens unit. Since the optical system according to the present invention comprises the reflecting member, eccentricity must be taken into consideration at the manufacturing stage and it is more preferable to use a smaller number of airspaces which are to be changed for focusing. At least two airspaces, one between the front lens unit and the rear lens unit and the other between the rear lens unit and the image pickup surface, are changed by moving the rear lens unit for focusing, and it is preferable to change the distance between the front lens unit and the image pickup surface since this change causes a change of only one airspace.

Furthermore, the optical system described above can be focused also by changing the airspace between the front lens unit and the rear lens unit.

Since the state of the light bundle passing through the rear lens unit is not changed more remarkably and the performance is little degraded by changing the airspace between the front lens unit and the rear lens unit, this focusing means facilitates to manufacture the optical system. When an electronic image pickup device is to be used, it is preferable to keep unchanged a positional relation between the aperture stop and the rear lens unit so that a location of the exit pupil is little changed by focusing.

Furthermore, it is possible to focus the photographic optical system described above by means which is explained below. This means is to move the front lens unit and the reflecting member in a direction along an optical axis of the rear lens unit.

This means is preferable since it permits reducing a size of a camera body and changes an airspace for focusing.

As another focusing means for the photographic optical system described above, it is preferable to move the front lens unit in a direction along an optical axis of the front lens unit.

This focusing means causes no deviation of a center location of a photographing range dependently on photographing distances and changes an airspace for focusing.

Furthermore, the photographic optical system described above can be focused also by changing an airspace between the rear lens unit and the image pickup surface without changing a positional relation between the front lens unit and the rear lens unit.

This focusing means which keeps unchanged the positional relation between the front lens unit and the rear lens unit permits favorably keeping an eccentric relation between the front lens unit and the rear lens unit throughout the manufacturing stage and a period of use. Furthermore, this focusing means changes an airspace for focusing and causes a change of the airspace which is smaller than that caused by moving only the front lens unit.

Next focusing means for the photographic optical system described above is to move the image pickup surface in the direction along the optical axis.

This focusing means which keeps unchanged the positional relation between the front lens unit and the rear lens unit permits maintaining the eccentric relation between the front lens unit and the rear lens unit throughout the manufacturing stage and the period of use, and causes no deviation of the center location of the photographing range dependently on the photographing distances. Furthermore, this focusing means changes an airspace for focusing.

Now, description will be made of the preferred embodiments of the photographic optical system according to the present invention.

Embodiment 1
f=9.88, F number=2.8, 2ω=59.12°
$r_1=42.746$
    $d_1=1.80$ $n_1=1.48749$ $v_1=70.23$
$r_2=9.841$
    $d_2=21.36$
$r_3$=Stop
    $d_3=5.09$
$r_4=96.670$
    $d_4=4.16$ $n_2=1.69350$ $v_2=53.20$
$r_5=-14.943$ (aspherical surface)
    $d_5=0.08$
$r_6=9.051$
    $d_6=6.95$ $n_3=1.62041$ $v_3=60.29$
$r_7=-33.014$
    $d_7=0.98$ $n_4=1.80518$ $v_4=25.42$
$r_8=5.859$
    $d_8=4.21$
$r_9=-51.618$
    $d_9=5.06$ $n_5=1.58913$ $v_5=61.28$
$r_{10}=-7.361$ (aspherical surface)
    $d_{10}=1.50$
$r_{11}=\infty$
    $d_{11}=1.00$ $n_6=1.51633$ $v_6=64.14$
$r_{12}\infty$
    $d_{12}=1.60$ $n_7=1.54771$ $v_7=62.84$
$r_{13}=\infty$
Aspherical Surface Coefficients
(5th Surface)
    K=0, $A_4=6.18542\times10^{-5}$, $A_6=3.07784\times10^{-7}$
(10th Surface)
    K=0, $A_4=4.92151\times10^{-4}$, $A_6=-3.57904\times10^{-6}$
        $A_8=4.22919\times10^{-8}$
$f_F=-26.7$, $d_M=21.36$, $S_d=32.15$, $|\Phi(F)|_{MAX}=0.05$
$|f_F|/f=2.7$, $d_M/f=2.16$, $S_d/f=3.25$
$|f_F|\cdot|\Phi(F)|_{MAX}=1.32$ Embodiment 2
f=9.25, F number=2.8, 2ω=62.3°
$r_1=-98.394$ (aspherical surface)
    $d_1=1.80$ $n_1=1.58913$ $v_1=61.28$
$r_2=-10.805$
    $d_2=18.20$
$r_3$=Stop
    $d_3=2.55$
$r_4=13.958$
    $d_4=2.75$ $n_2=1.69350$ $v_2=53.20$
$r_5=-26.756$ (aspherical surface)
    $d_5=2.54$
$r_6=9.820$
    $d_6=4.56$ $n_3=1.60311$ $v_3=60.64$
$r_7=-64.950$
    $d_7=1.00$ $n_4=1.84666$ $v_4=23.78$
$r_8=5.859$
    $d_8=5.79$
$r_9=18.845$
    $d_9=4.55$ $n_5=1.58913$ $v_5=61.28$
$r_{10}=-13.015$ (aspherical surface)
    $d_{10}=1.50$
$r_{11}=\infty$
    $d_{11}=1.00$ $n_6=1.51633$ $v_6=64.14$
$r_{12}=\infty$
    $d_{12}=1.60$ $n_7=1.54771$ $v_7=62.84$
$r_{13}=\infty$
Aspherical Surface Coefficients
(1st Surface)
    K=0, $A_4=5.58357\times10^{-5}$, $A_6=-4.14808\times10^{-7}$
        $A_8=1.28954\times10^{-9}$
(5th Surface)
    K=0, $A_4=9.78223\times10^{-5}$, $A_6=1.17455\times10^{31\ 7}$
(10th Surface)
    K=0, $A_4=3.44027\times10^{-4}$, $A_6=-4.38435\times10^{-6}$
        $A_8=1.41569\times10^{-8}$
$f_F=-16.42$, $d_M=18.2$, $S_d=29.25$, $|\Phi(F)|_{MAX}=0.055$
$|f_F|/f=1.78$, $d_M/f=1.97$, $S_d/f=3.16$
$|f_F|\cdot|\Phi(F)|_{MAX}=0.90$ Embodiment 3
f=9.2, F number=2.84, 2ω=62.44°
$r_1=-232.992$
    $d_1=1.80$ $n_1=1.58913$ $v_1=61.14$
$r_2=10.801$
    $d_2=0.10$ $n_2=1.52540$ $v_2=51.81$
$r_3=10.110$ (aspherical surface)
    $d_3=18.15$
$r_4$=Stop
    $d_4=2.57$
$r_5=13.603$
    $d_5=2.74$ $n_3=1.69350$ $v_3=53.20$
$r_6=-28.051$ (aspherical surface)
    $d_6=2.93$
$r_7=9.701$
    $d_7=4.08$ $n_4=1.62041$ $v_4=60.29$
$r_8=-111.996$
    $d_8=1.00$ $n_5=1.84666$ $v_5=23.78$
$r_9=5.844$
    $d_9=5.87$
$r_{10}=18.410$
    $d_{10}=4.50$ $n_6=1.58913$ $v_6=61.28$
$r_{11}=-13.505$ (aspherical surface)
    $d_{11}=1.50$
$r_{12}=\infty$
    $d_{12}=1.00$ $n_7=1.51633$ $v_7=64.14$
$r_{13}=\infty$
    $d_{13}=1.60$ $n_8=1.54771$ $v_8=62.84$
$r_{14}=\infty$ Aspherical Surface Coefficients
(3rd Surface)
    K=0, $A_4$=-8.64018×10$^{-5}$, $A_6$=-3.70851×10$^{-7}$
        $A_8$=4.56798×10$^{-10}$
(6th Surface)
    K=0, $A_4$=1.01759×10$^{-4}$, $A_6$=1.48094×10$^{-7}$
(11th Surface)
    K=0, $A_4$=3.49307×10$^{-4}$, $A_6$=-4.50658×10$^{-6}$
        $A_8$=1.35369×10$^{-8}$
$f_F$=-16.5, $d_M$=18.15, $S_d$=29.2, $|\Phi(F)|_{MAX}$=0.052
$|f_F|/f$=1.79, $d_M/f$=1.97, $S_d/f$ =3.17
$|f_F|\cdot|\Phi(F)|_{MAX}$=0.86
Embodiment 4
f=9.79, F number=2.8, 2ω59.7°
$r_1$=39.640
    $d_1$=1.20 $n_1$=1.48749 $v_1$=70.23
$r_2$=14.314
    $d_2$=1.98
$r_3$=∞
    $d_3$=1.20 $n_2$=1.48749 $v_2$=70.23
$r_4$=15.174
    $d_4$=18.46
$r_5$=Stop
    $d_5$=2.58
$r_6$=14.921
    $d_6$=2.73 $n_3$=1.69350 $v_3$=53.20
$r_7$=-30.840 (aspherical surface)
    $d_7$=1.59
$r_8$=10.298
    $d_8$=5.40 $n_4$=1.60311 $v_4$=60.64
$r_9$=-31.224
    $d_9$=0.90 $n_5$=1.80518 $v_5$=25.42
$r_{10}$=6.358
    $d_{10}$=6.92
$r_{11}$=14.393
    $d_{11}$=4.02 $n_6$=1.58913 $v_6$=61.28
$r_{12}$=-22.708 (aspherical surface)
    $d_{12}$=1.50
$r_{13}$=∞
    $d_{13}$=1.00 $n_7$=1.51633 $v_7$=64.14
$r_{14}$=∞
    $d_{14}$=1.60 $n_8$=1.54771 $v_8$=62.84
$r_{15}$=∞
Aspherical Surface Coefficients
(7th Surface)
    K=0, $A_4$=6.44731×10$^{-5}$, $A_6$=3.21178×10$^{-7}$
        $A_8$=-3.87477×10$^{-9}$
(12th surface)
    K=0, $A_4$=2.60474×10$^{-4}$, $A_6$=-3.13648×10$^{-6}$
        $A_8$=5.10784×10$^{-8}$, $A_{10}$=-5.88468×10$^{-10}$
$f_F$=-18.13, $d_M$=18.46, $S_d$=29.63, $|\Phi(F)|_{MAX}$=0.034
$|f_F|/f$=1.85, $d_M/f$=1.88, $S_d/f$=3.03
$|f_F|\cdot|\Phi(F)|_{MAX}$=0.62
Embodiment 5
f=5.50, F number=2.8, 2ω=62.8°
$r_1$=-60.637
    $d_1$=1.20 $n_1$=1.48749 $v_1$=70.23
$r_2$=7.577
    $d_2$=0.10 $n_2$=1.52540 $v_2$=51.81
$r_3$=7.000 (aspherical surface)
    $d_3$=12.82
$r_4$=Stop
    $d_4$=3.50
$r_5$=52.789
    $d_5$=1.83 $n_3$=1.69350 $v_3$=53.20
$r_6$=-12.745 (aspherical surface)
    $d_6$=0.20
$r_7$=7.710
    $d_7$=6.34 $n_4$=1.62041 $v_4$=60.29
$r_8$=-19.744
    $d_8$=1.00 $n_5$=1.84666 $v_5$=23.78
$r_9$=5.126
    $d_9$=1.38
$r_{10}$=29.293
    $d_{10}$=3.46 $n_6$=1.58913 $v_6$=61.28
$r_{11}$=-5.269 (aspherical surface)
    $d_{11}$=1.00
$r_{12}$=∞
    $d_{12}$=1.00 $n_7$=1.51633 $v_7$=64.14
$r_{13}$=∞
    $d_{13}$=1.60 $n_8$=1.54771 $v_8$=62.84
$r_{14}$=∞
Aspherical Surface Coefficients
(3rd Surface)
    K=0, $A_4$=-2.44722×10$^{-4}$, $A_6$=-2.19103×10$^{-6}$
(6th Surface)
    K=0, $A_4$=1.16651×10$^{-4}$, $A_6$=9.70290×10$^{-7}$
(11th Surface)
    K=0, $A_4$=1.52533×10$^{-3}$, $A_6$=-5.62303×10$^{-6}$
        $A_8$=-2.99182×10$^{-7}$
$f_F$=-12.73, $d_M$=12.82, $S_d$=22.57, $|\Phi(F)|_{MAX}$=0.075
$|f_F|/f$=2.31, $d_M/f$=2.33, $S_d/f$=4.10
$|f_F|\cdot|\Phi(F)|_{MAX}$=0.96
Embodiment 6
f=9.80, F number=2.42, 2ω=59.78°
$r_1$=48.477
    $d_1$=1.20 $n_1$=1.48749 $v_1$=70.23
$r_2$=11.512
    $d_2$=2.38
$r_3$=2529.640
    $d_3$=1.20 $n_2$=1.48749 $v_2$=70.23
$r_4$=23.329
    $d_4$=19.73
$r_5$=Stop
    $d_5$=1.50
$r_6$=18.321
    $d_6$=3.00 $n_3$=1.69350 $v_3$=53.20
$r_7$=-27.773 (aspherical surface)
    $d_7$=2.19
$r_8$=9.005
    $d_8$=5.11 $n_4$=1.60311 $v_4$=60.64
$r_9$=-45.931
    $d_9$=0.90 $n_5$1.80518 $v_5$=25.42
$r_{10}$=6.187
    $d_{10}$=7.14
$r_{11}$=16.416 (aspherical surface)
    $d_{11}$=4.18 $n_6$=1.58913 $v_6$=61.28
$r_{12}$=-21.021
    $d_{12}$=1.50
$r_{13}$=∞
    $d_{13}$=1.00 $n_7$=1.51633 $v_7$=64.14
$r_{14}$=∞
    $d_{14}$=1.60 $n_8$=1.54771 $v_8$=62.84
$r_{15}$=∞
Aspherical Surface Coefficients (7th Surface)
    $K=0$, $A_4=4.73035\times10^{-5}$, $A_6=1.62799\times10^{-7}$
        $A_8=-6.11850\times10^{-9}$
(11th Surface)
    $K=0$, $A_4=-1.62354\times10^{-4}$, $A_6=1.66376\times10^{-6}$
        $A_8=-2.87036\times10^{-8}$, $A_{10}=3.38014\times10^{-10}$
$f_F=-18.32$, $d_M=19.73$, $S_d=29.51$, $|\phi(F)|_{MAX}=0.042$
$|f_F|/f=1.87$, $d_M/f=2.01$, $S_d/f=3.01$
$|f_F|\cdot|\phi(F)|_{MAX}=0.78$
Embodiment 7
$f=4.50$, F number=2.8, $2\omega=72°$
$r_1=13.829$
    $d_1=0.80$ $n_1=1.48749$ $\nu_1=70.23$
$r_2=5.794$
    $d_2=1.46$
$r_3=44.935$
    $d_3=0.80$ $n_2=1.48749$ $\nu_2=70.23$
$r_4=7.189$
    $d_4=9.70$
$r_5=\infty$ (Stop)
    $d_5=1.00$
$r_6=369.947$
    $d_6=1.71$ $n_3=1.69350$ $\nu_3=53.20$
$r_7=-8.716$ (aspherical surface)
    $d_7=2.12$
$r_8=5.117$
    $d_8=3.35$ $n_4=1.61272$ $\nu_4=58.72$
$r_9=-21.161$
    $d_9=0.78$ $n_5=1.80518$ $\nu_5=25.42$
$r_{10}=3.964$
    $d_{10}=1.49$
$r_{11}=14.527$
    $d_{11}=3.06$ $n_6=1.58913$ $\nu_6=61.28$
$r_{12}=-5.306$ (aspherical surface)
    $d_{12}=0.50$
$r_{13}=\infty$
    $d_{13}=0.80$ $n_7=1.51633$ $\nu_7=64.14$
$r_{14}=\infty$
    $d_{14}=1.61$ $n_8=1.54771$ $\nu_8=62.84$
$r_{15}=\infty$
    $d_{15}=0.80$
$r_{16}=\infty$
    $d_{16}=0.75$ $n_9=1.51633$ $\nu_9=64.14$
$r_{17}=\infty$
    $d_{17}=1.19$
$r_{18}=\infty$ (image surface)
Aspherical Surface Coefficients
(7th Surface)
    $K=0$, $A_2=0$, $A_4=2.4940\times10^{-4}$,
        $A_6=6.4183\times10^{-6}$, $A_8=1.9672\times10^{-7}$
(12th Surface)
    $K=0$, $A_2=0$, $A_4=1.5616\times10^{-3}$,
        $A_6=-3.6288\times10^{-5}$, $A_8=3.4761\times10^{-6}$
        $A_{10}=-2.0162\times10^{-7}$
$f_F=-9.22$, $d_M=9.70$, $S_d=18.06$, $|\phi(F)|_{MAX}=0.084$
$|f_F|/f=2.05$, $d_M/f=2.16$, $S_d/f=4.01$
$|f_F|\cdot|\phi(F)|_{MAX}=0.78$, $\nu_{P1}=53.2$
Embodiment 8
$f=4.51$, F number=2.8, $2\omega=65.3°$
$r_1=16.224$
    $d_1=0.80$ $n_1=1.48749$ $\nu_1=70.23$
$r_2=5.801$
    $d_2=1.07$
$r_3=98.436$
    $d_3=0.80$ $n_2=1.48749$ $\nu_2=70.23$
$r_4=6.814$
    $d_4=8.50$
$r_5=\infty$ (Stop)
    $d_5=1.00$
$r_6=-1983.367$
    $d_6=1.54$ $n_3=1.76200$ $\nu_3=40.10$
$r_7=-9.991$
    $d_7=1.63$
$r_8=5.507$
    $d_8=3.34$ $n_4=1.60311$ $\nu_4=60.64$
$r_9=-7.643$
    $d_9=0.80$ $n_5=1.80518$ $\nu_5=25.42$
$r_{10}=7.395$
    $d_{10}=3.15$
$r_{11}=10.825$
    $d_{11}=2.05$ $n_6=1.58913$ $\nu_6=61.28$
$r_{12}=-9.705$ (aspherical surface)
    $d_{12}=0.63$
$r_{13}=\infty$
    $d_{13}=0.80$ $n_7=1.51633$ $\nu_7=64.14$
$r_{14}=\infty$
    $d_{14}=1.44$ $n_8=1.54771$ $\nu_8=62.84$
$r_{15}=\infty$
    $d_{15}=0.80$
$r_{16}=\infty$
    $d_{16}=0.75$ $n_9=1.51633$ $\nu_9=64.14$
$r_{17}=\infty$
    $d_{17}=1.19$
$r_{18}=\infty$ (image surface)
Aspherical Surface Coefficients
(12th Surface)
    $K=0$, $A_2=0$, $A_4=2.2090\times10^{-3}$,
        $A_6=-1.0120\times10^{-4}$, $A_8=1.6778\times10^{-5}$
        $A_{10}=-7.2348\times10^{-7}$
$f_F=-8.08$, $d_M=8.50$, $S_d=18.18$, $|\phi(F)|_{MAX}=0.084$
$|f_F|/f=1.79$, $d_M/f=1.89$, $S_d/f=4.04$
$|f_F|\cdot|\phi(F)|_{MAX}=0.68$, $\nu_{P1}=40.1$
Embodiment 9
$f=4.53$, F number=2.80, $2\omega=72°$
$r_1=15.243$
    $d_1=0.80$ $n_1=1.48749$ $\nu_1=70.23$
$r_2=5.737$
    $d_2=1.53$
$r_3=80.379$
    $d_3=0.80$ $n_2=1.48749$ $\nu_2=70.23$
$r_4=7.142$
    $d_4=9.20$
$r_5=\infty$ (Stop)
    $d_5=1.00$
$r_6=-76.066$
    $d_6=1.50$ $n_3=1.80100$ $\nu_3=34.97$
$r_7=-9.737$
    $d_7=1.60$
$r_8=5.350$
    $d_8=3.32$ $n_4=1.60311$ $\nu_4=60.64$
$r_9=-6.961$
    $d_9=0.80$ $n_5=1.80518$ $\nu_5=25.42$
$r_{10}=7.255$
    $d_{10}=3.48$
$r_{11}=11.000$ $d_{11}=2.07$ $n_6=1.58913$ $v_6=61.28$
$r_{12}=-10.135$ (aspherical surface)
$d_{12}=0.48$
$r_{13}=\infty$
$d_{13}=0.80$ $n_7=1.51633$ $v_7=64.14$
$r_{14}=\infty$
$d_{14}=1.61$ $n_8=1.54771$ $v_8=62.84$
$r_{15}=\infty$
$d_{15}=0.80$
$r_{16}=\infty$
$d_{16}=0.75$ $n_9=1.51633$ $v_9=64.14$
$r_{17}=\infty$
$d_{17}=1.19$
$r_{18}=\infty$ (image surface)
Aspherical Surface Coefficients
(12th Surface)
$K=0$, $A_2=0$, $A_4=2.0496\times10^{-3}$,
$A_6=-8.3731\times10^{-5}$, $A_6 1.3273\times10^{-5}$
$A_{10}=-5.1232\times10^{-7}$
$f_F=-8.39$, $d_M=9.20$, $S_d=18.29$, $|\phi(F)|_{MAX}=0.085$
$|f_F|/f=1.85$, $d_M/f=2.03$, $S_d/f=4.04$
$|f_F|\cdot|\phi(F)|_{MAX}=0.71$, $v_{P1}=35$
Embodiment 10
$f=4.67$, F number=2.8, $2\omega=65.4°$
$r_1=16.551$
$d_1=0.80$ $n_1=1.48749$ $v_1=70.23$
$r_2=6.140$
$d_2=1.32$
$r_3=147.959$
$d_3=0.80$ $n_2=1.48749$ $v_2=70.23$
$r_4=7.145$
$d_4=8.20$
$r_5=\infty$ (Stop)
$d_5=1.00$
$r_6=32.774$
$d_6=2.16$ $n_3=1.69350$ $v_3=53.20$
$r_7=-10.067$ (aspherical surface)
$d_7=2.63$
$r_8=5.104$
$d_8=2.95$ $n_4=1.60311$ $v_4=60.64$
$r_9=-31.004$
$d_9=0.80$ $n_5=1.80518$ $v_5=25.42$
$r_{10}=4.151$
$d_{10}=1.56$
$r_{11}=11.350$
$d_{11}=2.89$ $n_6=1.58913$ $v_6=61.28$
$r_{12}=-6.422$ (aspherical surface)
$d_{12}=1.25$
$r_{13}=\infty$
$d_{13}=0.83$ $n_7=1.51633$ $v_7=64.14$
$r_{14}=\infty$
$d_{14}=1.33$ $n_8=1.54771$ $v_8=62.84$
$r_{15}=\infty$
$d_{15}=0.50$
$r_{16}=\infty$
$d_{16}=0.62$ $n_9=1.51633$ $v_9=64.14$
$r_{17}=\infty$
$d_{17}=1.03$
$r_{18}=\infty$ (image surface)
Aspherical Surface Coefficients
(7th Surface)
$K=0$, $A_2=0$, $A_4=2.1899\times10^{-4}$, $A_6=-7.1464\times10^{-6}$, $A_8=1.0891\times10^{-6}$
(12th Surface)
$K=0$, $A_2=0$, $A_4=1.5933\times10^{-3}$,
$A_6=-5.7616\times10^{-5}$, $A_6=7.7259\times10^{-6}$
$A_{10}=-3.8745\times10^{-7}$
$f_F=-8.44$, $d_M=8.21$, $S_d=18.58$, $|\phi(F)|_{MAX}=0.079$
$|f_F|/f=1.81$, $d_M/f=1.76$, $S_d/f=3.98$
$|f_F|\cdot|\phi(F)|_{MAX}=0.67$, $v_{P1}=53.2$
Embodiment 11
$f=4.46$, F number=2.8, $2\omega=67.4°$
$r_1=331.274$
$d_1=0.97$ $n_1=1.58313$ $v_1=59.46$
$r_2=4.498$ (aspherical surface)
$d_2=8.19$
$r_3=\infty$ (Stop)
$d_3=1.00$
$r_4=32.504$
$d_4=1.52$ $n_2=1.78590$ $v_2=44.20$
$r_5=-14.192$
$d_5=3.38$
$r_6=5.414$
$d_6=3.30$ $n_3=1.60311$ $v_3=60.64$
$r_7=-9.668$
$d_7=0.80$ $n_4=1.78470$ $v_4=26.29$
$r_8=5.633$
$d_8=1.83$
$r_9=6.853$
$d_9=2.37$ $n_5=1.58913$ $v_5=61.28$
$r_{10}=-10.837$ (aspherical surface)
$d_{10}=1.25$
$r_{11}=\infty$
$d_{11}=0.83$ $n_6=1.51633$ $v_6=64.14$
$r_{12}=\infty$
$d_{12}=1.33$ $n_7=1.54771$ $v_7=62.84$
$r_{13}=\infty$
$d_{13}=0.50$
$r_{14}=\infty$
$d_{14}=0.62$ $n_8=1.51633$ $v_8=64.14$
$r_{15}=\infty$
$d_{15}=1.02$
$r_{16}=\infty$ (image surface)
Aspherical Surface Coefficients
(2nd Surface)
$K=0$, $A_2=0$, $A_4=-1.1090\times10^{-3}$,
$A_6=4.5664\times10^{-5}$, $A_8=-6.2569\times10^{-6}$
(10th Surface)
$K=0$, $A_2=0$, $A_4=2.8944\times10^{-3}$,
$A_6=-1.2487\times10^{-4}$, $A_8=1.6050\times10^{-5}$
$A_{10}=-5.7076\times10^{-7}$
$f_F=-7.83$, $d_M=8.19$, $S_d=19.57$, $|\phi(F)|_{MAX}=0.130$
$|f_F|/f=1.75$, $d_M/f=1.84$, $S_d/f=4.39$
$|f_F|\cdot|\phi(F)|_{MAX}=1.01$, $v_{P1}=44.2$
wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

The first through eleventh embodiments have compositions illustrated in FIGS. 1 through 11.

Each of the first, second, third, fifth and eleventh embodiments comprises a front lens unit which is composed of a negative lens element, an aperture stop, and a rear lens unit which is composed of a first positive lens element, a cemented lens component consisting of a positive lens element and a negative lens element, and a second positive lens element.

Out of these embodiments, the first embodiment uses aspherical surfaces as an image side surface ($r_5$) of the first positive lens element and an image side surface ($r_{10}$) of the second lens element of the rear lens unit, the second embodiment uses aspherical surfaces as an object side surface of the negative lens element of the front lens unit, and an image side surface ($r_5$) of the first positive lens element and an image side surface ($r_{10}$) of the second positive lens element of the rear lens unit, each of the third and fifth embodiments uses aspherical surfaces as an image side surface of the negative lens element of the front lens unit, an image side surface ($r_3$) of resin layer disposed on the image side of the negative lens element, an image side surface ($r_6$) of the first positive lens element and an image side surface ($r_{11}$) of the second positive lens element of the rear lens unit, and the eleventh embodiment uses aspherical surfaces as an image side surface ($r_2$) of the negative lens element of the front lens unit and an image side surface ($r_{10}$) of the second positive lens element of the rear lens unit.

Each of the fourth, sixth, seventh, eighth, ninth and tenth embodiments uses a front lens unit which is composed of two negative lens elements, and a rear lens unit which is composed of a first positive lens element, a cemented lens component consisting of a positive lens element and a negative lens element, and a second positive lens element.

Out of these embodiments, each of the fourth, seventh and tenth embodiments uses aspherical surfaces as an image side surface ($r_7$) of the first positive lens element and an image side surface ($r_{12}$) of the second positive lens element of the rear lens unit, and the sixth embodiment uses aspherical surfaces as an image side surface ($r_7$) of the first positive lens element and an object side surface ($r_{11}$) of the second positive lens element of the rear lens unit. each of the eighth and ninth embodiments uses an aspherical surface as an image side surface ($r_{12}$) of the second positive lens element of the rear lens unit.

Each of the first through eleventh embodiments uses a reflecting surface (mirror) between the front lens unit and the aperture stop, thereby folding an optical path.

In each of the first, second, third, fifth and eleventh embodiments out of the embodiments mentioned above, the reference symbol $r_3$ represents the aperture stop.

In the fourth, sixth, seventh, eighth, ninth and tenth embodiments, the reference symbol $r_4$ designates the aperture stop.

Shapes of the aspherical surfaces used in the embodiments of the present invention is expressed by the following formula:

$$x=(y^2/r)/[1+\{1-(1+k)(y/r)^2\}^{1/2}]+A_4y^4+A_6y^6+A_8y^8+A_{10}y^{10}$$

wherein the direction of the optical axis is taken as an x axis, a direction perpendicular to the optical axis is taken as a y axis, the reference symbol r represents a radius of curvature of a reference sphere, and the reference symbols k, $A_4$, $A_6$, $A_8$ and $A_{10}$ designate the aspherical surface coefficients.

In each of the sectional views (FIGS. 1 through 11) illustrating the compositions of the embodiments, a plane parallel plate disposed in the vicinity of the image surface represents a low pass filter and an infrared cut filter.

Though the reflecting surface (mirror) is disposed between the front lens unit and the aperture stop in each of the first through eleventh embodiments, a prism reflecting member such as a triangular prism may be used in place of the mirror.

Furthermore, the optical system preferred as the second through eleventh embodiments are focused by moving the front lens units along the optical axis. Only the front lens unit may be moved in the direction along the optical axis of the front lens unit or the front lens unit and the reflecting member may be moved as an integral unity in the direction along the optical axis of the rear lens unit. For an object distance of 10 cm, the front lens unit is moved for distances which are listed below:

Second embodiment 2.297 mm

Third embodiment 2.315 mm

Fourth embodiment 2.722 mm

Fifth embodiment 1.427 mm

Sixth embodiment 2.784 mm

Seventh embodiment 0.77 mm

Eighth embodiment 0.60 mm

Ninth embodiment 0.64 mm

Tenth embodiment 0.65 mm

Eleventh embodiment 0.56 mm

Furthermore, the optical system may be focused by moving the rear lens unit and the image pickup device as an integral unit so as to change a distance along the optical axis to the front lens unit.

Each of the seventh through eleventh embodiments can be focused by moving the rear lens unit or the optical system as a whole.

To focus each of the optical systems preferred as the seventh through eleventh embodiments on an object located at a distance of 10 cm by moving the optical system as a whole, the optical system is moved for distances listed below:

Seventh embodiment 0.19 mm

Eighth embodiment 0.19 mm

Ninth embodiment 0.19 mm

Tenth embodiment 0.21 mm

Eleventh embodiment 0.19 mm

The performance of the optical system is varied little when the front lens unit is moved along the optical axis to focus the optical system preferred as each of these embodiments and the performance is degraded little due to eccentricity between the front lens unit and the rear lens unit when the optical system is moved as a whole along the optical axis for focusing. When the optical system is moved for focusing, it is possible to obtain a merit of a short moving distance and focus the optical system on the image side (side of a CCD), or by moving the image surface relative to the optical system.

Aberration conditions of the second embodiment of the present invention in conditions where it is focused on an object located at an infinite distance and the object located at the distance of 10 cm by moving the front lens unit along the optical axis are shown in FIGS. 12A–12D and FIGS. 13A–13D, respectively. Furthermore, aberration conditions of the seventh embodiment of the present invention in conditions where it is focused on the object located at the infinite distance, on the object located at the distance of 10 cm by moving the front lens unit along the optical axis and on the object located at the distance of 10 cm by moving the optical system as a whole along the optical axis are shown in FIGS. 14A–14D, FIGS. 15A–15D and 16A–16D, respectively.

As seen from these aberration curves, the photographic optical systems preferred as these embodiments of the present invention favorably correct aberrations for images of the object located at the infinite distance and objects located at short distances. Like these embodiments, the other embodiments also correct aberrations favorably.

The photographic optical system according to the present invention can be used in various kinds of photographing apparatuses such as electronic cameras which use electronic image pickup devices such as CCDs and CMOS sensors.

Now, description will be made of examples of photographing apparatus which uses the photographic optical system according to the present invention.

Figure 17:
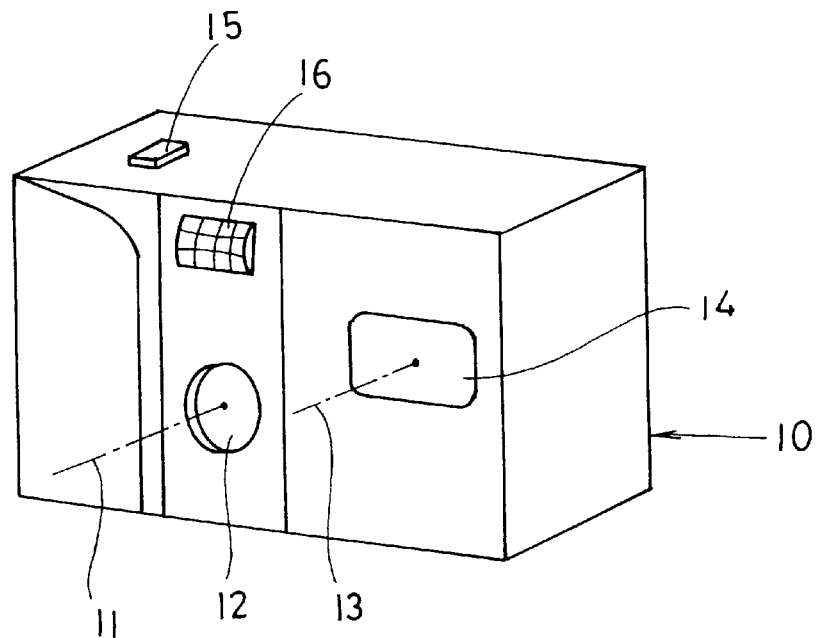
FIGS. 17, 18 and 19 are diagrams showing a camera which uses the photographic optical system according to the present invention.
Figure 18:
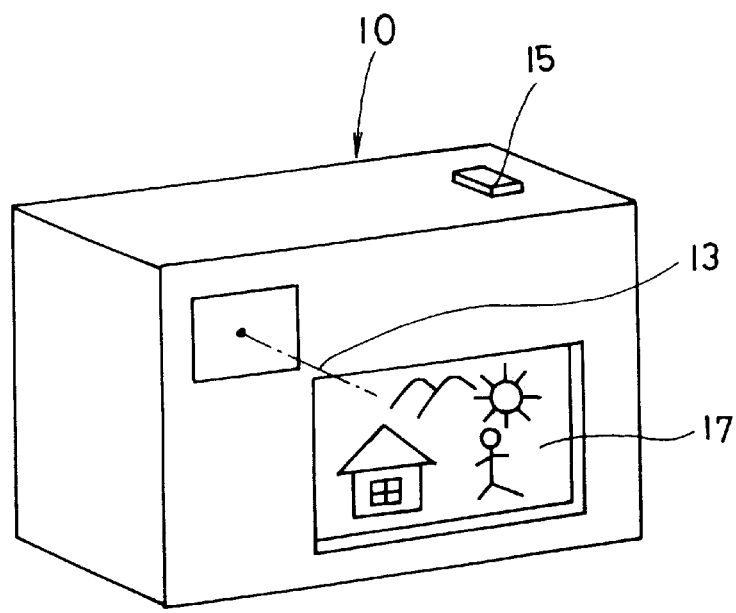
Figure 19:
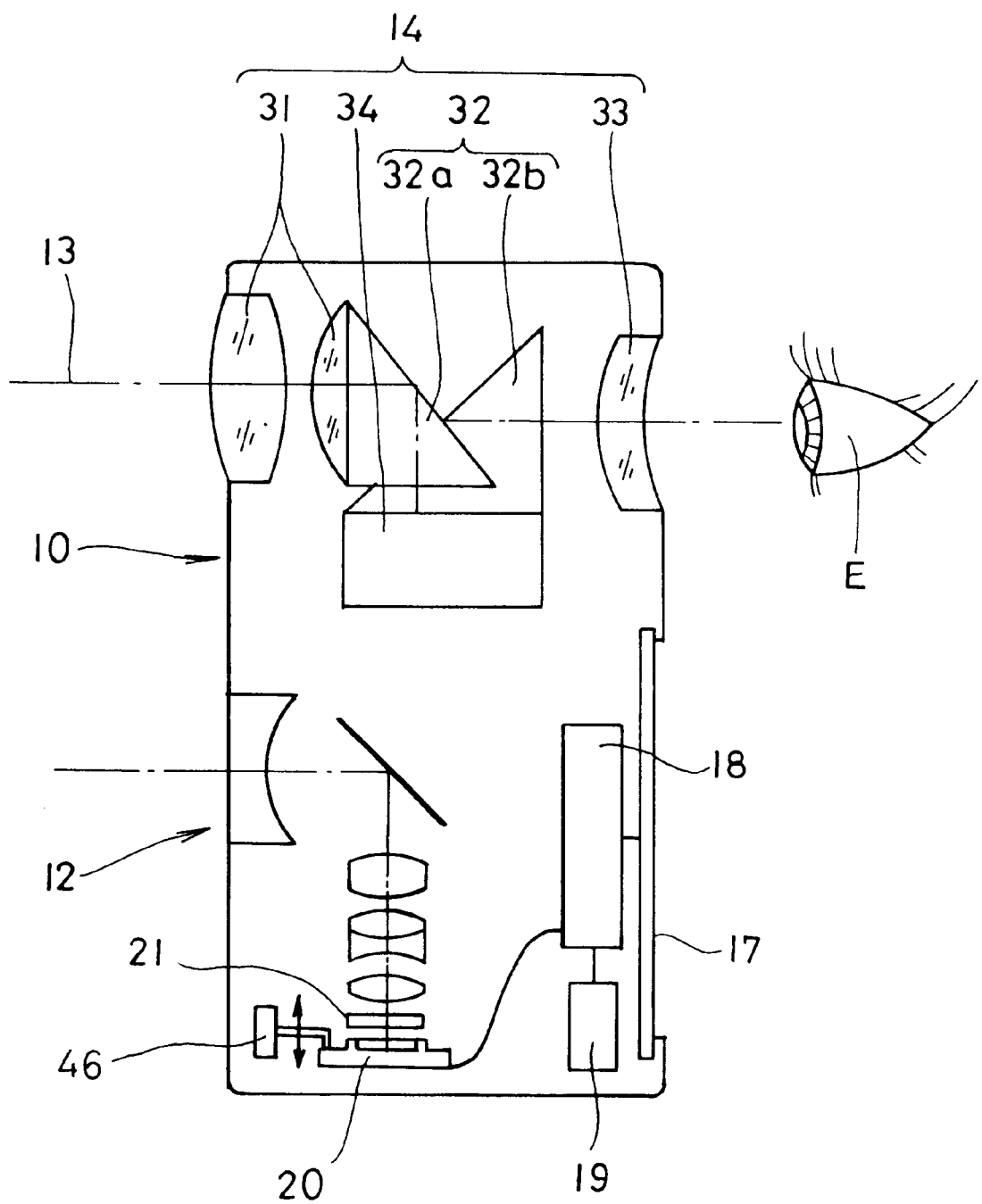

FIGS. 17, 18 and 19 are diagrams showing an electronic camera in which the photographic optical system according to the present invention is built. FIGS. 17 through 19 are a front perspective view showing an external appearance of the electronic camera, a rear perspective view showing the external appearance of the electronic camera and a sectional view respectively. A reference numeral 10 represents the electronic camera which comprises a photographic optical system 12 having a photographing optical path 11, a view finder optical system 14 having a view finder optical path 13, a shutter 15, a flash lamp 16 and a liquid crystal display monitor 17. When the shutter disposed on a ceiling of the camera 10 is depressed, photographing is performed in conjunction with the shutter through an objective lens 12 which is the photographic optical system according to the present invention (not shown). By the photographic optical system 12, an image of an object is formed on an image pickup device chip 20 such as a CCD by way of an infrared cut filter 21.

The image of the object received by the image pickup device chip 20 is inverted while passing through electrically connected processing means 22 and displayed as an erect image on the liquid crystal display monitor 17 disposed on a rear surface of the camera 10. Furthermore, processing means 18 converts the erect image of the object picked up by the image pickup device chip 20 into electric signals and controls recording means 19 which records the image as electronic data. This recording means 19 may be a memory disposed on the processing means 18 or composed of the processing means 18 and a device which records data electrically as shown in FIG. 19.

Furthermore, the view finder optical system 14 having a view finder optical path 13 comprises a view finder objective optical system 31, a Porro prism 32 which erects an image of the object formed by the view finder objective optical system and an eyepiece 33 which leads the image of the object to an observer's eye E. The Porro prism 32 is divided into a front portion 32a and a rear portion 32b and has, between these portions, a surface on which the image of the object is to be formed and a visual field frame 34 is disposed. The Porro prism 32 has four reflecting surfaces and erect the image of the object formed by the view finder objective optical system into an elect image.

Furthermore, the view finder optical system 14 may be omitted to reduce a number of parts, thereby making the camera 10 more compact and reduce a manufacturing cost of the camera 10. In such a case, the observer carries out photographing while observing the liquid crystal display monitor 17.

To focus the electronic camera, the image pickup chip 20 can be moved by moving a movable unit 46.

Now, a personal computer will be described with reference to FIGS. 20 through 23 as an example of date processing apparatus comprising the photographic optical system according to the present invention.

Figure 20:
FIGS. 20, 21, 22 and 23 are diagrams showing a personal computer which comprises the photographic optical system according to the present invention.
Figure 21:
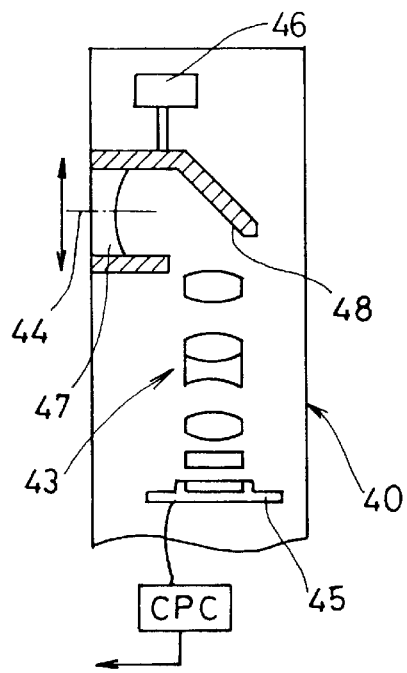
Figure 22:
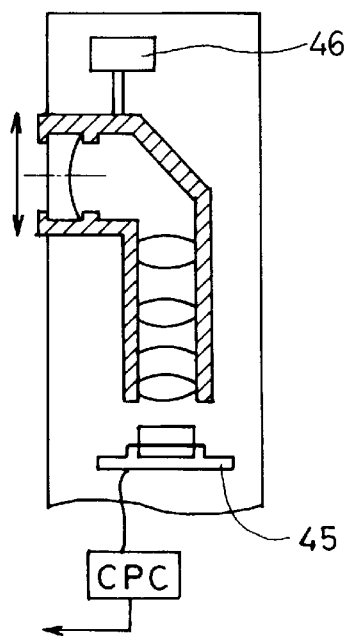
Figure 23:
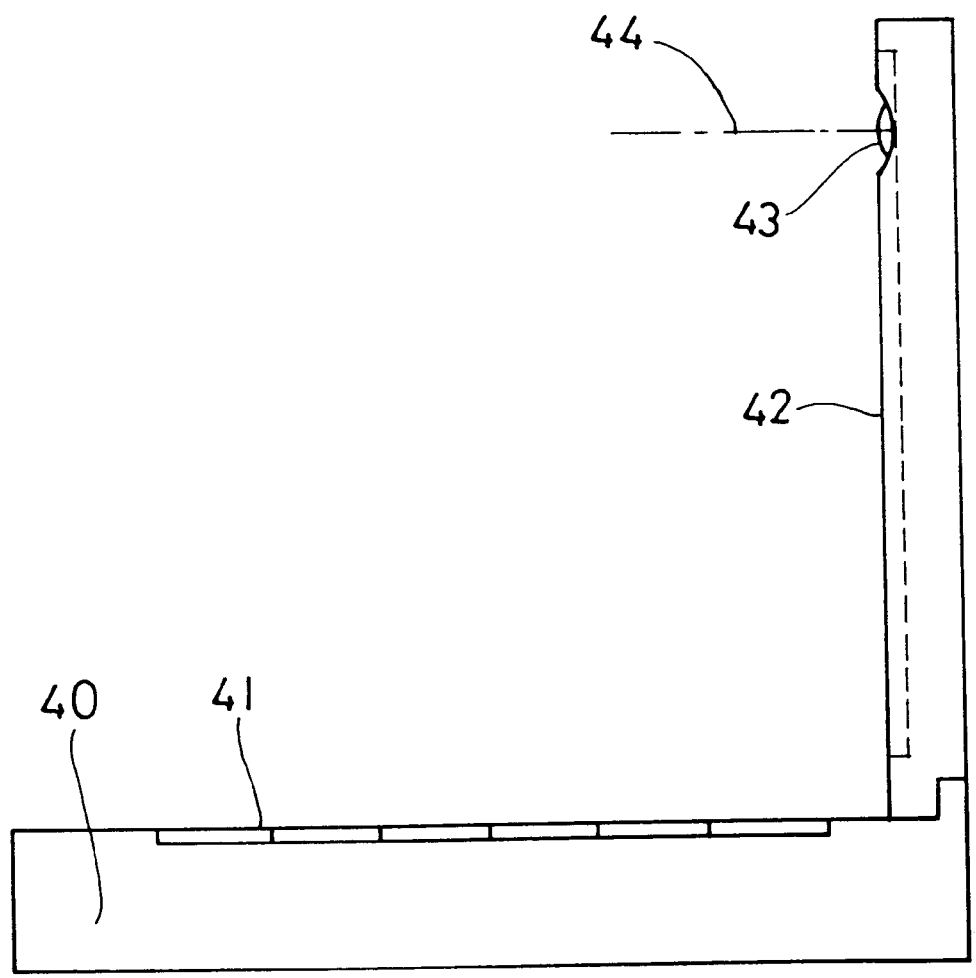

Out of these drawings, FIG. 20 is a front perspective view showing a personal computer 40 in a condition where its cover is kept open, FIG. 21 is a sectional view showing a photographic optical system 43 of the personal computer 40 and FIG. 22 is a side view of the personal computer shown in FIG. 20.

The personal computer 40 has a keyboard 41 which is used by an operator to input data from outside, data processing means and recording means (not shown), a monitor 42 which displays data for the operator, and a photographic optical system 43 which photographs images of the operator himself and surroundings. The monitor 42 may be a transmission type liquid crystal display element having a rear surface illuminated with back light, a reflection type liquid crystal display element which displays an image by reflecting rays with a front surface or a CRT display. Though the photographic optical system is built in an upper right side location of the monitor 42, this location is not limitative and the optical system may be disposed at any location such as a circumferential location in the monitor 42 or the keyboard.

A photographic optical system used in the personal computer 40 has the photographic optical system 43 according to the present invention and an image pickup device chip 45 which are disposed in a photographic optical path 44 and built in the personal computer 40.

To focus the photographic optical system built in the personal computer, a front lens unit 47 and a reflecting mirror 48 can be moved integrally up and down by moving a movable unit 46. In other words, the photographic optical system can be focused by moving the front lens unit and the mirror 48 in a direction along an optical axis OA(R) of a rear lens unit. Furthermore, the photographic optical system may be focused by moving the optical system up and down as a whole relative to a CCD (image pickup device) as shown in FIG. 22.

An image of an object received by the image pickup device chip 45 is input into the processing means (CPU) of the personal computer 40 and displayed on the monitor as an erect electronic image. As an example of such electronic image, a photographed image of the operator is shown in FIG. 20. Furthermore, this image 45 can be displayed on a personal computer of a communicating mate at a remote location by way of the processing means and internet or telephone.

Figure 24:
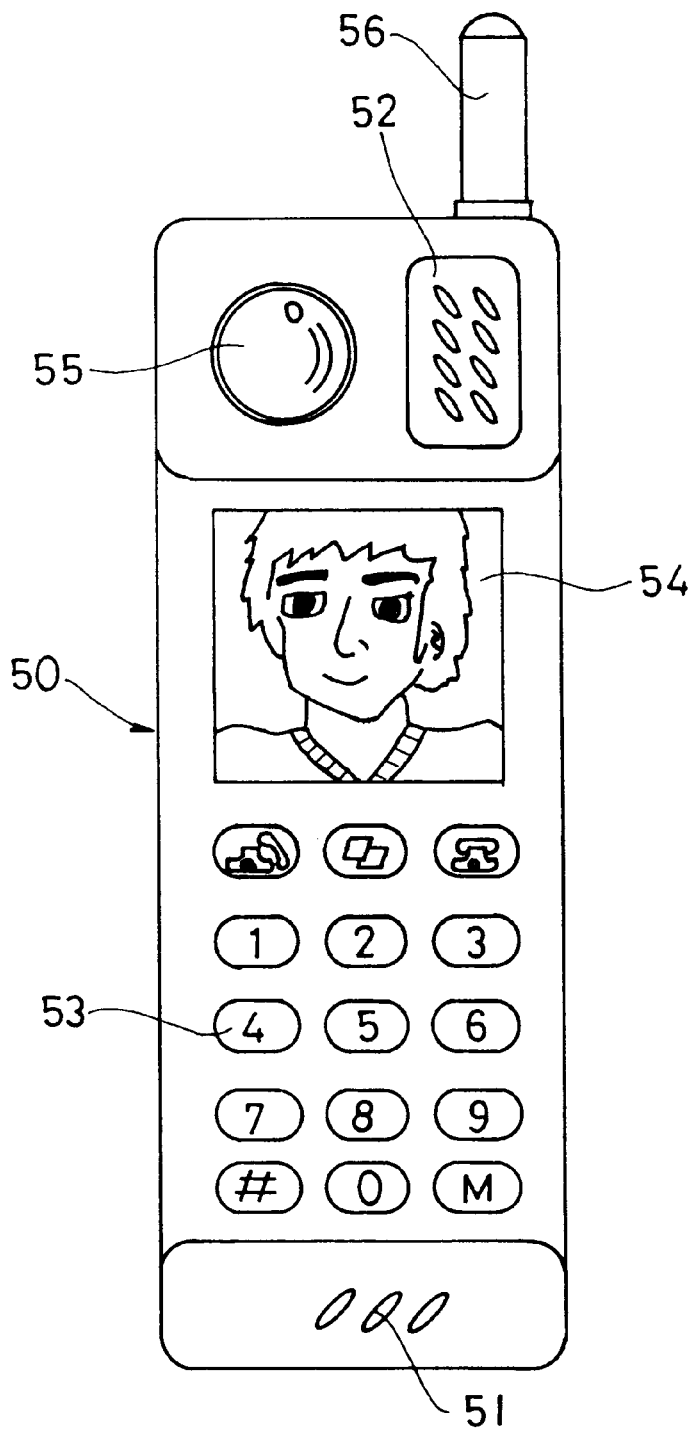
FIGS. 24, 25 and 26 are diagrams showing a portable telephone which comprises the photographic optical system according to the present invention.
Figure 25:
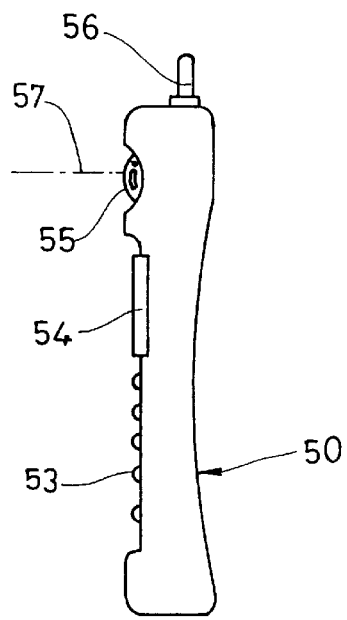
Figure 26:
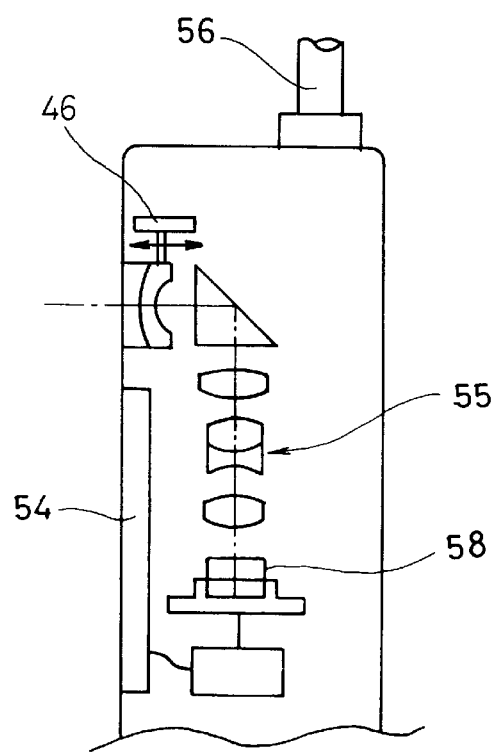

FIGS. 24 through 26 show a telephone set, portable telephone set convenient for carriage in particular, as an example of data processing apparatus which comprises the photographing optical system according to the present invention.

FIG. 24 is a front view of a portable telephone set 50, FIG. 25 is a side view of the portable telephone set 50 and FIG. 26 is a sectional view of a photographic optical system used in the portable telephone set 50.

As shown in FIGS. 24 through 26, the portable telephone set 50 has a microphone 51 which inputs an operator's voice as data, a loudspeaker 52 which outputs a voice of a communicating mate, an input dial 53 which is used by the operator to input data, a monitor 54, for example, a liquid crystal display element which displays a photographed image of the operator himself or the communicating mate and data such as a telephone number, a photographic optical system 55, an antenna 56 which transmits and receives communicating radio waves, and processing means (not shown) which processes image data, communicating data, input signals, etc. Locations of these members shown in the drawings are exemplary and not limitative.

A photographic optical system built in the portable telephone set 50 has an objective lens system 55 which has the photographic optical system according to the present invention disposed in a photographing optical path 57 and an image pickup device chip 58 which receives an image of an object formed by the objective lens system 55. To focus this photographic optical system, a front lens unit is moved back and forth along an optical axis AX by moving a lens moving unit.

The image of the object which is formed by the photographic optical system 55 and received by the image pickup device chip 58 in input into processing means and displayed as an erect electronic image on either or both of the monitor 54 and a monitor of a communicating mate. When an image is to be transmitted to the communicating mate, the processing means comprises a signal processing function which converts data of the image of the object received by the image pickup device chip 58 into transmissible signals.

The present invention is capable of providing a photographic optical system which can comprise a reflecting member to permit thinning a camera body by folding an optical path and exhibits favorable optical performance within a range from an infinite distance to an extremely short distance as shown in the drawings clarifying the aberration characteristics.

What is claimed is:

1. A photographic optical system comprising in order from the object side: a front lens unit which comprises at least a negative lens element and has negative refractive power as a whole; and a rear lens unit which comprises at least two positive lens elements and at least a negative lens element, and has positive refractive power as a whole, wherein a reflecting member to fold an optical path and an aperture stop are disposed in order from the object side between said front lens unit and said rear lens unit, and wherein said photographic optical system satisfies the following conditions (1) and (2):

$$1.5 < |f_F|/f < 3.5 \quad (1)$$

$$1.6 < d_M/f < 2.6 \quad (2)$$

wherein the reference symbol f represents a focal length of said optical system as a whole, the reference symbol $f_F$ designates a focal length of said front lens unit and the reference symbol $d_M$ denotes an optical path length on an optical axis from a final surface of said front lens unit to said aperture stop.

2. The photographic optical system according to claim 1, wherein said rear lens unit comprises, in order from the object side, a first positive biconvex positive lens element, a cemented lens component consisting of a positive lens element and a negative lens element, and a second positive lens element, wherein said second positive lens element has an aspherical surface, and wherein said optical system satisfies the following condition (3):

$$2 < S_d/f < 5 \quad (3)$$

wherein the reference symbol $S_d$ represents a distance as measured from said aperture stop to an axial image surface.

3. The photographic optical system according to claim 1, wherein said rear lens unit comprises, in order from the object side, a first biconvex positive lens element, a cemented lens component consisting of a positive lens element and a negative lens element, and a second positive lens element, wherein said first positive lens element and said second positive lens element have aspherical surfaces respectively, and wherein said optical system satisfies the following condition (3):

$$2 < S_d/f < 5 \quad (3)$$

wherein the reference symbol $S_d$ represents a distance as measured from said aperture stop to an axial image surface.

4. The photographic optical system according to claim 1, 2 or 3, wherein said front lens unit consists, in order from the object side, of a negative meniscus lens element which has a convex surface on the object side and a negative lens element which has curvature on an image side surface higher than that on an object side surface.

5. The photographic optical system according to claim 4 satisfying the following condition (4):

$$0.5/|f_F| < |\phi(F)|_{MAX} < 1.2/|f_F| \quad (4)$$

wherein the reference symbol $f_F$ represents a focal length of said front lens unit, and $|\phi(F)|_{MAX}$ designates a maximum value in absolute of surface power of said front lens unit.

6. The photographic optical system according to claim 1, 2 or 3, wherein said front lens unit consists of a negative lens element which has an aspherical surface.

7. The photographic optical system according to claim 6 satisfying the following condition (4):

$$0.5/|f_F| < |\phi(F)|_{MAX} < 1.2/|f_F| \quad (4)$$

wherein the reference symbol $f_F$ represents a focal length of said front lens unit, and $|\phi(F)|_{MAX}$ designates a maximum value in absolute of surface power of said front lens unit.

8. The photographic optical system according to claim 1, 2 or 3, wherein the first positive lens element of said rear lens unit satisfies the following condition (5):

$$28 < \nu_{P1} < 57 \quad (5)$$

wherein the reference symbol $\nu_{P1}$ represents an Abbe's number of the first positive lens element of said rear lens unit.

9. The photographic optical system according to claim 1, 2 or 3, wherein the first positive lens element of said rear lens unit satisfies the following condition (5-1):

$$32 < \nu_{P1} < 48 \quad (5\text{-}1).$$

wherein the reference symbol $\nu_{P1}$ represents an Abbe's number of the first positive lens element of said rear lens unit.

10. A photographic optical system comprising in order from the object side; a front lens unit which comprises at least a negative lens element and has negative refractive power as a whole; and a rear lens unit which comprises at least a positive lens element and has positive refractive power as a whole, wherein said optical system has an image pickup surface formed by said photographic optical system, wherein said optical system has a reflecting member to fold an optical path which is disposed between said front lens unit and said rear lens unit, and wherein said photographic optical system is focused by changing a distance along the optical axis between said front lens unit and said image pickup surface.

11. The photographic optical system according to claim 1, 2, 3 or 10, wherein said optical system is focused by changing a distance along an optical axis between said front lens unit and said rear lens unit.

12. The photographic optical system according to claim 11, wherein said optical system is focused by moving said front lens unit and said reflecting member in a direction along said rear lens unit.

13. The photographic optical system according to claim 11, wherein said optical system is focused by moving said front lens unit in a direction along an optical axis of said front lens unit.

14. The photographic optical system according to claim 1, 2, 3 or 10, wherein said optical system is focused by moving said front lens unit toward the object side.

15. The photographic optical system according to claim 10, wherein said optical system is focused by changing a distance along the optical axis between said rear lens unit and said image pickup surface without changing a relative positional relation between said front lens unit and said rear lens unit.

16. The photographic optical system according to claim 15, wherein said optical system comprises an image pickup device which is disposed on said image pickup surface and is focused by moving said image pickup device in a direction along the optical axis.

17. The photographic optical system according to claim 1, 2 or 3, wherein said optical system has an image pickup surface formed by said photographic optical system, and wherein said optical system is focused by changing a distance along an optical axis between said front lens unit and said image pickup surface.

18. The photographic optical system according to claim 17, wherein said optical system is focused by changing a distance along the optical axis between said rear lens unit and said image pickup surface without changing a relative positional relation between said front lens unit and said rear lens unit.

19. The photographic optical system according to claim 18, wherein said optical system comprises an image pickup device and is focused by moving said image pickup device in a direction along the optical axis.

20. The photographic optical system according to claim 1, 2, 3 or 10, wherein said reflecting member is a mirror.

21. The photographic optical system according to claim 1, 2, 3 or 10, wherein said reflecting member is a prism.

22. The photographic optical system according to claim 1, 2, 3 or 10, wherein a surface having refractive power of said front lens unit and a surface having refractive power of said rear lens unit are composed of spherical surfaces or aspherical surfaces which are rotationally symmetrical with regard to an optical axis.

23. The photographic optical system according to claim 22, wherein said reflecting member has only a reflecting surface and said reflecting surface is planar.

24. A photographic apparatus comprising: the photographic optical system according to claim 23; an image pickup device which is disposed on an image pickup surface formed by said photographic optical system; and signal processing means which converts an image received by said image pickup device into electric signals inside out.

25. The photographic apparatus according to claim 24 comprising display means which displays an image incident on said image pickup device as an image inside out on the basis of the electric signals converted by said signal processing means.

* * * * *